United States Patent [19]

Nakamura

[11] Patent Number: 4,820,241

[45] Date of Patent: Apr. 11, 1989

[54] TUBULAR TRANSMISSION SHAFT

[75] Inventor: Masanobu Nakamura, Kamakura, Japan

[73] Assignees: Mitsui & Co., Ltd., Tokyo; Kokan Kako Co., Ltd., Yokohama, both of Japan

[21] Appl. No.: 105,184

[22] Filed: Oct. 6, 1987

[30] Foreign Application Priority Data

Oct. 13, 1986 [JP] Japan .............................. 61-241393

[51] Int. Cl.$^4$ ............................................. F16C 3/02
[52] U.S. Cl. ................................................ 464/183
[58] Field of Search ................ 464/179, 181, 182, 183

[56] References Cited

U.S. PATENT DOCUMENTS 1,291,388  1/1919  Bright et al. .................... 464/179 X
4,238,540 12/1980  Yates et al. ..................... 464/181 X
4,248,062  2/1981  McLain et al. ..................... 464/181
4,380,443  4/1983  Federmann et al. ............. 464/183 X
4,451,245  5/1984  Hornig et al. .................. 464/183 X

FOREIGN PATENT DOCUMENTS 2851293  5/1979  Fed. Rep. of Germany ...... 464/181
6038565 12/1979  Japan .
2124735  2/1984  United Kingdom ................ 464/181

Primary Examiner—Daniel P. Stodola
Attorney, Agent, or Firm—Spencer & Frank

[57] ABSTRACT

A tubular transmission shaft for use as a drive shaft which transmits rotation from an engine to an axle of driving wheels of an automobile, including a tubular member having a smaller diameter at the middle portion thereof and larger diameter at both ends thereof and solid shaft members which are inserted and pressure tightened in both ends of the tubular member.

4 Claims, 1 Drawing Sheet

TUBULAR TRANSMISSION SHAFT

BACKGROUND OF THE INVENTION

This invention relates to a transmission shaft, and more particularly to a tubular transmission shaft suitable for a drive shaft of an automobile.

PRIOR ART

As a prior art drive shaft which transmits rotation from an engine to an axle of driving wheels of an automobile, there has been known a drive shaft using a solid metal shaft member. The solid metal shaft, however, is disadvantageous in that it inevitably is heavy and expensive.

As a solution to this problem, there has been proposed a drive shaft shown in FIG. 4 comprising a tubular metal member 10 having a smaller diameter at both ends thereof and a larger diameter at the middle portion 12 therebetween in a manner that the section moduli at the above two different portions have the following relation in order to avoid fractures caused by stress concentration on the smaller diameter portions 13 and to distribute the stress uniformly over the whole of the pipe member (See Japanese Patent Publication No. Sho 60-38565)

$$0.8\, Z_1 < Z_0 < 2.2\, Z_1$$

wherein
  $Z_0$ is the section modulus at the larger diameter portion 12, and
  $Z_1$ is the section modulus at the smaller diameter portions 13.

The tubular metal member 10 is formed to have a greater thickness $t_1$ at the portions 13 with the outer diameter $D_1$ than the thickness $t_0$ at the portion 12 with the outer diameter $D_0$.

OBJECT AND SUMMARY OF THE INVENTION

Although the abovementioned transmission shaft can avoid local concentration of stress, it is necessary to thicken the tubular member at both end portions by drawing in the moulding process. As the moulding of a tubular transmission shaft involves a complex operation and needs a large sized processing machine, the cost becomes overly high. An attempt was made to solve the problem by inserting solid shaft members into both ends of the tubular member and pressuring the resulting joints from the outside so as to tighten the joints (caulking the joints) so as to facilitate the moulding process of the tubular member. However, it was found that if solid shaft members were inserted in and pressure tightened at both ends of a tubular member, the stress would become concentrated at the tightened joint portions sufficiently to destroy them, and the portions would not have the predetermined strength.

The invention aims at providing a transmission member which comprises a tubular metal member and solid metal shaft members which are pressure tightened to both ends of the tubular member so as to thereby facilitate the moulding of the tubular member as well as to avoid stress concentration on tightened joint portions.

In order to attain such a purpose, the transmission shaft of this invention is characterized in that both end portions of a tubular member are given a larger diameter than that of the middle portion thereof, ends of solid shaft members are inserted into the larger diameter portions, and the outer circumferences of said larger diameter portions are pressure tightened from outside to thereby connect integrally the tubular member with the shaft members.

DETAILED DESCRIPTION OF PREFERRED EMBODIMENT

The present invention will now be described by referring to embodiments shown in the appended drawings.

Figure 1:
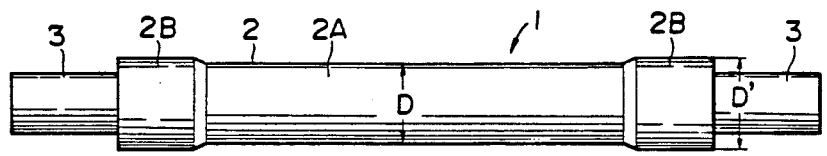
FIG. 1 is a frontal view to show one embodiment of the transmission shaft according to this invention.
Figure 2:
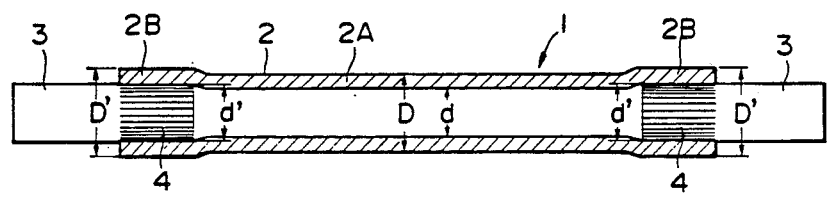
FIG. 2 is a vertical section thereof.
Figure 3:
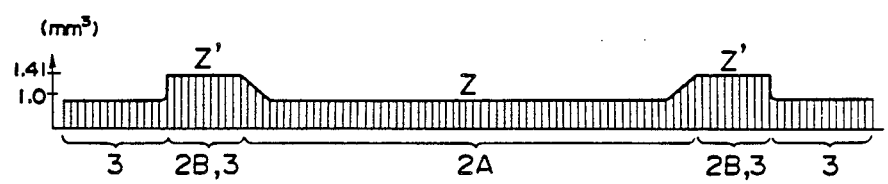
FIG. 3 is an explanatory view to compare the section moduli between respective portions of the shaft shown in FIG. 1.
Figure 4:
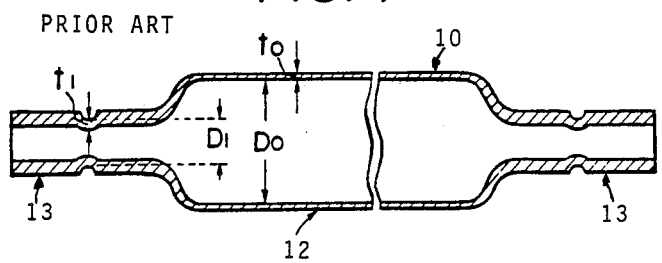
FIG. 4 shows a vertical section at the center of a prior art tubular shaft.

As shown in the frontal view in FIG. 1 and the vertical section in FIG. 2, the outer diameter $D'$ at both ends of a metal tube member 2 which is a component of a transmission shaft 1 is formed to be slightly larger than the outer diameter $D$ at the middle portion 2A. Solid metal shaft members 3,3 are inserted into the larger diameter portions 2B, 2B to the full depth of said portions 2B, 2B. The outer circumferences of the larger diameter portions 2B, 2B are processed and pressured by a suitable pressing means to connect these parts integrally.

In order to secure the effect of pressure tightening and to increase the resistance against rotational movement, a projection/recess portion 4 with a large number of grooves may be formed on each shaft member 3 in the outer peripheral surface as shown in FIG. 2 so that the projection/recess portion 4 is forced into (i.e. bite into) the tubular member during the pressure tightening process. Besides providing grooves, the projection/recess portion 4 may be formed by the process of knurling or threading.

The section modulus at the above larger diameter end portions 2B,2B is made 1.05–1.8 times larger then the section modulus at the middle portion 2A of the tubular member 2. The section modulus Z at the middle portion 2A of the tubular member 2 in the transmission tubular according to this invention and the section modulus at the larger diameter portion 2B,2B at the ends of the tubular member 2 can be expressed by the following equations:

$$Z = \frac{\pi \cdot (D^4 - d^4)}{32D}$$

$$Z' = \frac{\pi \cdot (D'^4 - d'^4)}{32D'}$$

wherein D: outer diameter at the middle portion 2A
  D': outer diameter at the larger diameter portions 2B
  d: inner diameter at the middle portion 2A
  d': inner diameter at the larger diameter portions 2B If it is assumed that D is 30 mm, d is 25 mm, D' is 35 mm, and d' is 30 mm in a transmission shaft, the section moduli Z and Z' can be calculated by the following equations:

$$Z = \frac{\pi \cdot (30^4 - 25^4)}{32 \times 30} = 1372.4\ (\text{mm}^3)$$

$$Z' = \frac{\pi \cdot (35^4 - 30^4)}{32 \times 35} = 1937.1 \text{ (mm}^3\text{)}$$

The ratio of Z to Z' will be

Z:Z' = 1372.4:1937.1 = 1:1.41, and the relation below holds:

1.05 Z < Z' < 1.8 Z

As the transmission shaft is constructed in the manner above, the section moduli are substantially the same at the middle portion 2A of the tubular member 2 and the shaft members 3,3, and larger at the pressure tighened portions. The transmission shaft thus constructed has therefore a predetermined strength without concentration of the stress at the larger diameter end portions 2B,2B of the tubular member 2 which are pressure tightened with the ends of shaft members 3,3 and a fracture at the pressure tightened portions can be avoided.

Though the transmission shaft according to this invention uses a tubular member, it can be manufactured by simple processing because it does not need a drawing operation to vary the thickness of the tubular member. As the solid shaft members are inserted into the end portions of the tubular member, the strength in attachment with other members is sufficiently high, and the structure of the attachment can be simple.

As the connection of the tubular member with solid shaft end portions is made by pressure tightening and the solid shaft members are inserted into the larger diameter portions of the tubular member, the section modulus at said pressure tightened portions becomes larger than that at the middle portion of the tubular member member. If the middle portion of the tubular member retains a predetermined strength, the transmission shaft can have a predetermined strength which is sufficiently high even though a tubular member is used as a component.

What we claim is:

1. A transmission shaft, comprising:
   a metal tubular member having opposite first and second end portions and a middle portion between said end portions, said end portions each having a section modulus which is a factor of between 1.05 and 1.8 larger that a section modulus of said middle portion; and
   first and second solid metal shaft members respectively disposed in the first and second end portions of said tubular member and pressure tightened therein so as to be integrally connected thereto.

2. The transmission shaft as claimed in claim 1 wherein the shaft members are each formed with a large number of grooves in an outer peripheral surface, which bite into an inner peripheral surface of said tubular member.

3. The transmission shaft as claimed in claim 1 wherein the first and second shaft members are formed with a threaded outer peripheral surface which bites into an inner peripheral surface of said tubular member.

4. The transmission shaft as claimed in claim 1 wherein the first and second shaft members are formed with a knurled outer peripheral surface which bites into an inner peripheral surface of said tubular member.

* * * * *